(12) United States Patent
Son et al.

(10) Patent No.: US 12,159,725 B2
(45) Date of Patent: Dec. 3, 2024

(54) LIGHT-WATER REACTOR NUCLEAR FUEL ROD LOADING FORCE MEASURING APPARATUS

(71) Applicant: KEPCO NUCLEAR FUEL CO., LTD., Daejeon (KR)

(72) Inventors: Se Ick Son, Sejong (KR); Je Won Lee, Daejeon (KR); Byung Tak Kim, Daejeon (KR); Sung Jun Park, Gyeonggi-do (KR); Young Duk Sim, Sejong (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 302 days.

(21) Appl. No.: 17/765,783

(22) PCT Filed: Oct. 22, 2019

(86) PCT No.: PCT/KR2019/013871
§ 371 (c)(1),
(2) Date: Mar. 31, 2022

(87) PCT Pub. No.: WO2021/071002
PCT Pub. Date: Apr. 15, 2021

(65) Prior Publication Data
US 2022/0392655 A1      Dec. 8, 2022

(30) Foreign Application Priority Data

Oct. 7, 2019  (KR) .................. 10-2019-0123609

(51) Int. Cl.
*G21C 17/06* (2006.01)
*G21C 3/334* (2006.01)
(52) U.S. Cl.
CPC ............. *G21C 17/06* (2013.01); *G21C 3/334* (2013.01)

(58) Field of Classification Search
CPC ................................ G21C 17/06; G21C 3/334
(Continued)

(56) References Cited

U.S. PATENT DOCUMENTS

| 4,724,607 | A | 2/1988 | Beuneche |
| 6,459,749 | B1 | 10/2002 | Cho et al. |
| 6,577,698 | B1 * | 6/2003 | Boonen ................. G21C 3/334 376/261 |

FOREIGN PATENT DOCUMENTS

| CN | 106531234 A | 3/2017 |
| CN | 209401319 U | 9/2019 |

(Continued)

OTHER PUBLICATIONS

Extended European Search Report issued by the EPO in connection with EP19948822.2 dated Jul. 7, 2023.

*Primary Examiner* — Jack W Keith
*Assistant Examiner* — Daniel Wasil
(74) *Attorney, Agent, or Firm* — Klintworth & Rozenblat IP LLP (57) ABSTRACT

A light-water reactor nuclear fuel rod loading apparatus, which comprises a spacer grid holder and a loading power device installed with a traction module configured to reciprocally move toward the spacer grid holder. The loading apparatus further comprises a hollow cladding tube sample and a pulling bar comprising one end part and an opposite end part. The one end part passing in use through a cell of a spacer grid held by the spacer grid holder and configured to couple to the hollow cladding tube sample. The opposite end part is coupled to the traction module. The loading apparatus further comprises: a measuring device installed on the pulling bar and configured to measure loading force of the traction module loading the pulling bar; a holder cap; and a holder comprising an end part configured to in use pass (Continued)

through the cladding tube sample and couple to the holder cap.

3 Claims, 5 Drawing Sheets

(58) Field of Classification Search
USPC .......................................................... 376/245
See application file for complete search history.

(56) References Cited

FOREIGN PATENT DOCUMENTS

| | | | | | |
|---|---|---|---|---|---|
| CN | 112309592 | A | * | 2/2021 | ............. G21C 3/334 |
| JP | H0247591 | A | * | 2/1990 | ............. G21C 17/06 |
| JP | 2007163345 | A | | 6/2007 | |
| JP | 2019504307 | A | | 2/2019 | |
| KR | 100709277 | B1 | | 4/2007 | |
| KR | 100982297 | B1 | | 9/2010 | |
| KR | 20190091716 | A | | 8/2019 | |

\* cited by examiner

LIGHT-WATER REACTOR NUCLEAR FUEL ROD LOADING FORCE MEASURING APPARATUS

This is a National Stage Application of International Patent Application No. PCT/KR2019/013871 filed Oct. 22, 2019, which claims the benefit of and priority to Korean Patent Application No. 10-2019-0123609 filed Oct. 7, 2019, the entirety of which are incorporated fully herein by reference.

TECHNICAL FIELD

The present technology relates to a light-water reactor nuclear fuel rod loading force measuring apparatus and, more particularly, to a light-water reactor nuclear fuel rod loading force measuring apparatus that may establish a database for establishment of optimizing and improving a nuclear fuel assembly process through a nuclear fuel rod loading force test acting on a cell of a spacer grid in a state in which the same environment as a nuclear fuel rod loading environment is provided.

BACKGROUND ART

In general, a light-water reactor (LWR) uses enriched uranium with a ratio of uranium-235 increased to 2-5%, and molding processing is performed to make uranium into cylindrical pellets weighing about 5 g for processing uranium into nuclear fuel used in nuclear reactors. Meanwhile, an energy source for nuclear fission is provided through nuclear fuel.

Figure 1:
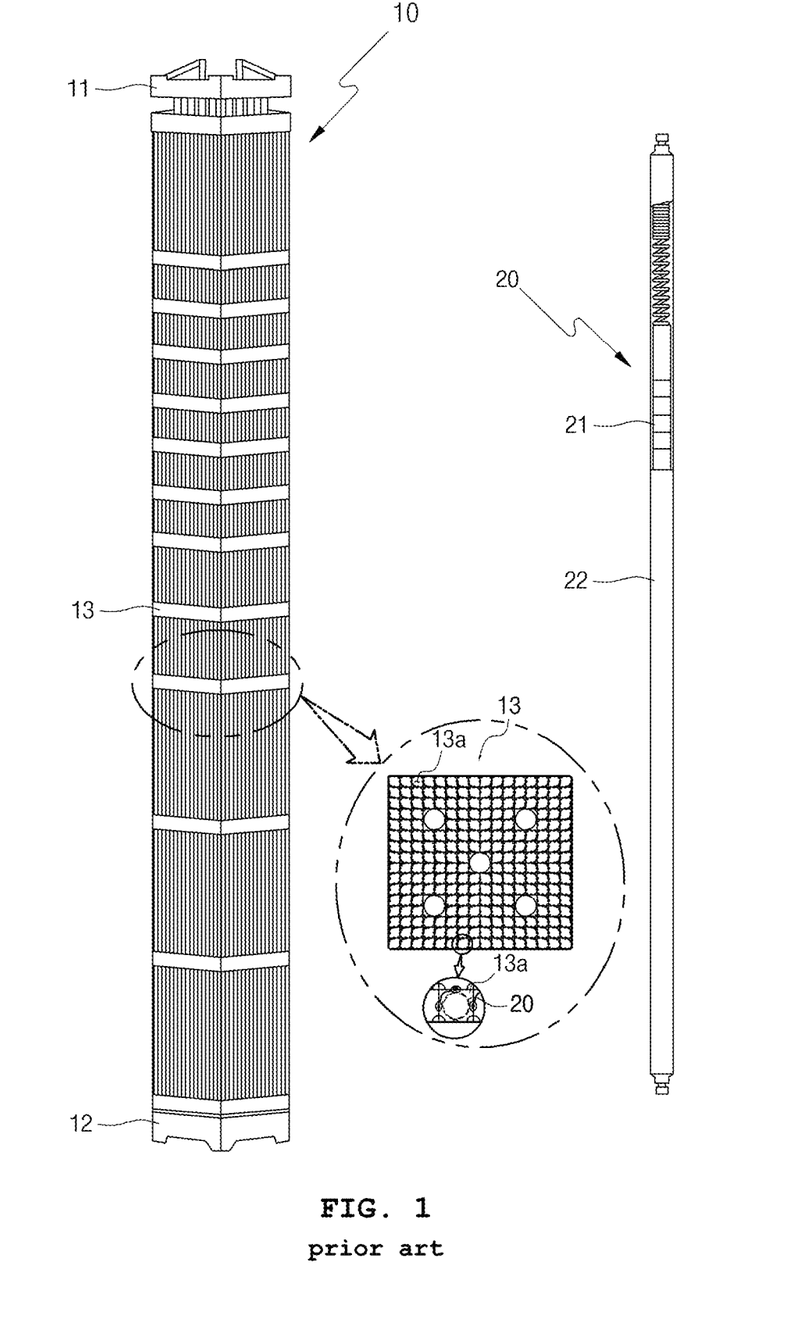
FIG. 1 is a view showing a light reactor nuclear fuel assembly and nuclear fuel rods.

The nuclear fuel arranged inside the nuclear reactor is composed of a nuclear fuel assembly 10 as one unit as shown in FIG. 1, and the nuclear fuel assembly 10 includes: a skeleton composed of a top nozzle 11, a bottom nozzle 12, and spacer grids 13; and nuclear fuel rods 20 loaded into the spacer grids 13 and supported by springs and dimples formed in the spacer grid 13. At this time, each nuclear fuel rod 20 includes uranium in a plurality of pellets 21 as one pellet unit and a zirconium alloy cladding tube 22 configured to protect the uranium and prevent radioactive leakage, and is provided in a form of a long bar.

Figure 2:
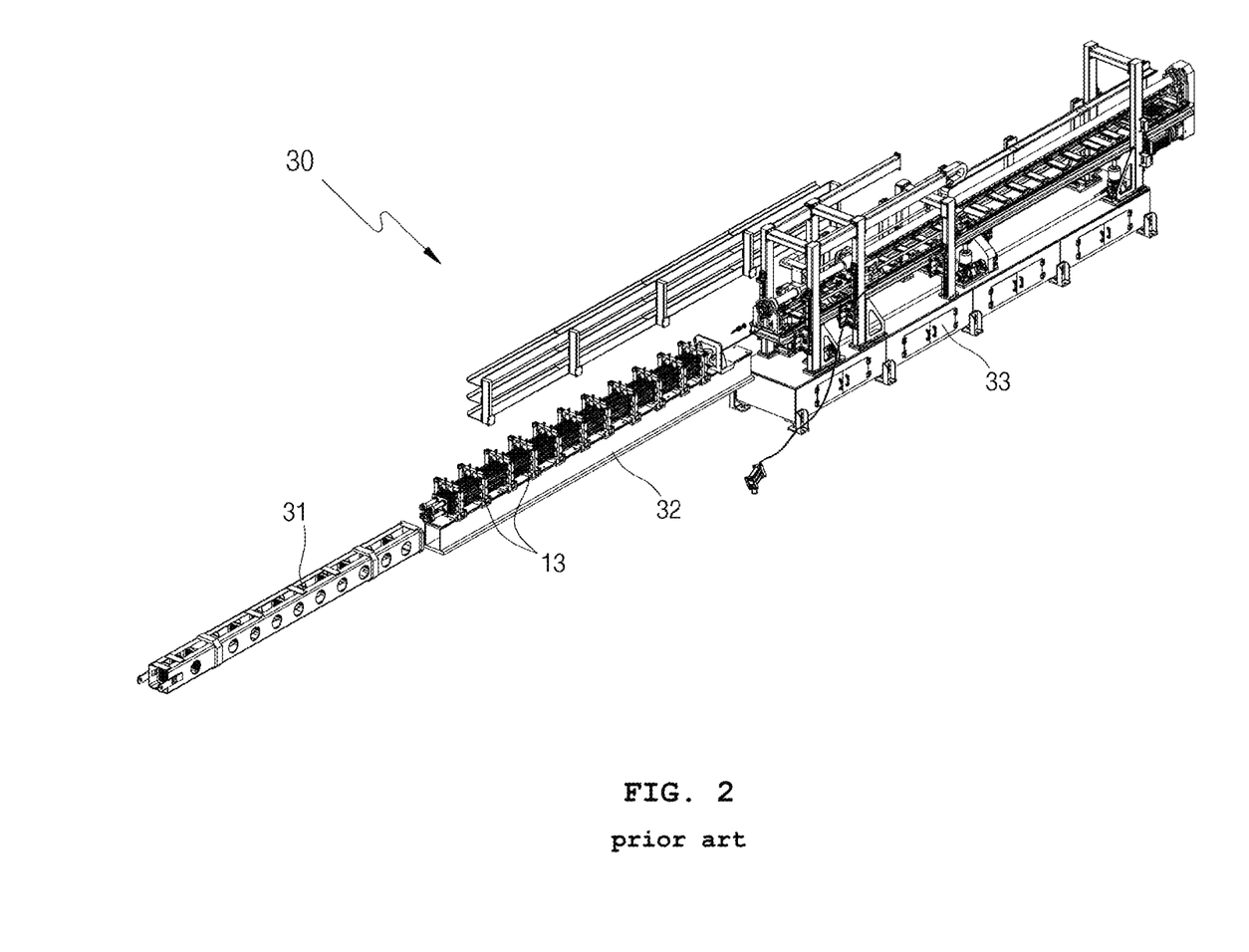
FIG. 2 is a view showing a nuclear fuel rod loading apparatus of the light water reactor nuclear fuel assembly.

A process of loading the fuel rods 20 into the nuclear fuel assembly 10 is performed through a nuclear fuel rod loading apparatus 30 shown in FIG. 2. The nuclear fuel rod loading apparatus 30 includes: a nuclear fuel rod holder 31 configured to position the nuclear fuel rods; a spacer grid holder 32, which is installed on one side of the nuclear fuel rod holder 31, and on which the spacer grids 13 of the nuclear fuel assembly 10 are mounted; and a loading power device 33 installed on one side of the spacer grid holder 32, configured to reciprocally move in a straight line toward the space grid holder 32, and configured to pull the fuel rod on the nuclear fuel rod holder 31 to the spacer grids 13 using a loading bar, thereby loading the nuclear fuel rod into a cell 13a of the spacer grid 13 shown in FIG. 1. At this time, the nuclear fuel rods are sequentially loaded into the spacer grids 13 by a column unit.

On the other hand, damage to surfaces of the nuclear fuel rods and deformation to the nuclear fuel assembly that occur during the loading of the fuel rods into the spacer grid 13 of the nuclear fuel assembly 10 are managed according to inspection standards, but technical data on effects of the nuclear fuel rods and nuclear fuel assembly according to the nuclear fuel rod loading conditions is in a state of not having been secured. In an assembly process of the nuclear fuel assembly, it is difficult to optimize and improve the process due to a lack of test data and technical data related to major process variables such as fuel rod loading force and a loading speed. Accordingly, in order to understand a trend of the deformation of the nuclear fuel assembly according to the fuel rod loading conditions, it is required to construct fuel rod loading data through a nuclear fuel rod loading test in the spacer grids.

DOCUMENTS OF RELATED ART

Patent Document

Korean Patent No. 10-2019-0091716

DISCLOSURE

Technical Problem

Accordingly, the present disclosure has been made keeping in mind the above problems occurring in the related art and is intended to provide a light-water reactor nuclear fuel rod loading force measuring apparatus so that fuel rod loading force acting on cells of spacer grids may be measured while the fuel rod for a specimen is loaded between the cells of the spacer grids using a conventional fuel rod loading apparatus.

Technical Solution

In order to accomplish the above objective, there may be provided a light-water reactor nuclear fuel rod loading force measuring apparatus provided with a nuclear fuel rod loading apparatus, which comprises a spacer grid holder and a loading power device installed with a traction module configured to reciprocally move toward the spacer grid holder, the measuring apparatus including: a hollow cladding tube sample positioned on one side of a spacer grid and having the same diameter as a nuclear fuel rod cladding tube; a pulling bar having one end part passing through a cell of the spacer grid and coupled to the hollow cladding tube sample and an opposite end part coupled to the traction module; and a measuring means installed on the pulling bar and configured to measure force of the traction module loading the pulling bar.

At this time, the traction module may be provided with a guide plate formed with a through-hole passing through both sides, and the opposite end part of the pulling bar passes through one side of the through-hole of the guide plate and may be screwed to the measuring means at an opposite side of the through-hole of the guide plate.

In addition, the pulling bar may include a holder for coupling the cladding tube sample, wherein one end part of the holder may be screwed to one end part of the pulling bar, and the opposite end part of the holder may pass through the cladding tube sample and may be coupled to a holder cap.

At this time, the holder cap and the holder may be each formed with a step to support the cladding tube sample.

Advantageous Effects

As described above, a light-water reactor nuclear fuel rod loading force measuring apparatus according to the present disclosure can use an existing nuclear fuel rod loading device, so additional equipment for measuring the nuclear fuel rod loading force is not required. Accordingly, there is an effect of increasing economic feasibility.

In addition, the light-water reactor nuclear fuel rod loading force measuring apparatus can provide the same environment as a nuclear fuel rod loading environment, so there is an effect of increasing reliability of the nuclear fuel rod loading force measuring with respect to the spacer grid.

In addition, the light-water reactor nuclear fuel rod loading force measuring apparatus can optimize a nuclear fuel assembly process through establishment of loading force data of the spacer grid and has the effect of enabling an improvement plan to be effectively established.

BEST MODE

Terms or words used in the present specification and claims are not to be construed as limited in ordinary or dictionary meanings thereof and, on a principle that the inventor may appropriately define a concept of the term in order to best describe his or her invention, should be interpreted as meaning and a concept consistent with a technical idea of the present disclosure.

Hereinafter, a light-water reactor nuclear fuel rod loading force measuring apparatus according to an exemplary embodiment of the present disclosure will be described with reference to accompanying FIGS. 3 to 5.

The light-water reactor nuclear fuel rod loading force measuring apparatus may be configured to use an existing nuclear fuel rod loading apparatus, thereby measuring loading force acting on each cell of a spacer grid in the same environment as a nuclear fuel rod loading work environment. Through measurement of the loading force of each cell of the space grid by such a light-water reactor nuclear fuel rod loading force measuring apparatus, the loading force of each cell of the space grid according to fuel rod loading conditions may be built into data. Accordingly, technical data that may optimize the nuclear fuel assembly process may be obtained.

Figure 3:
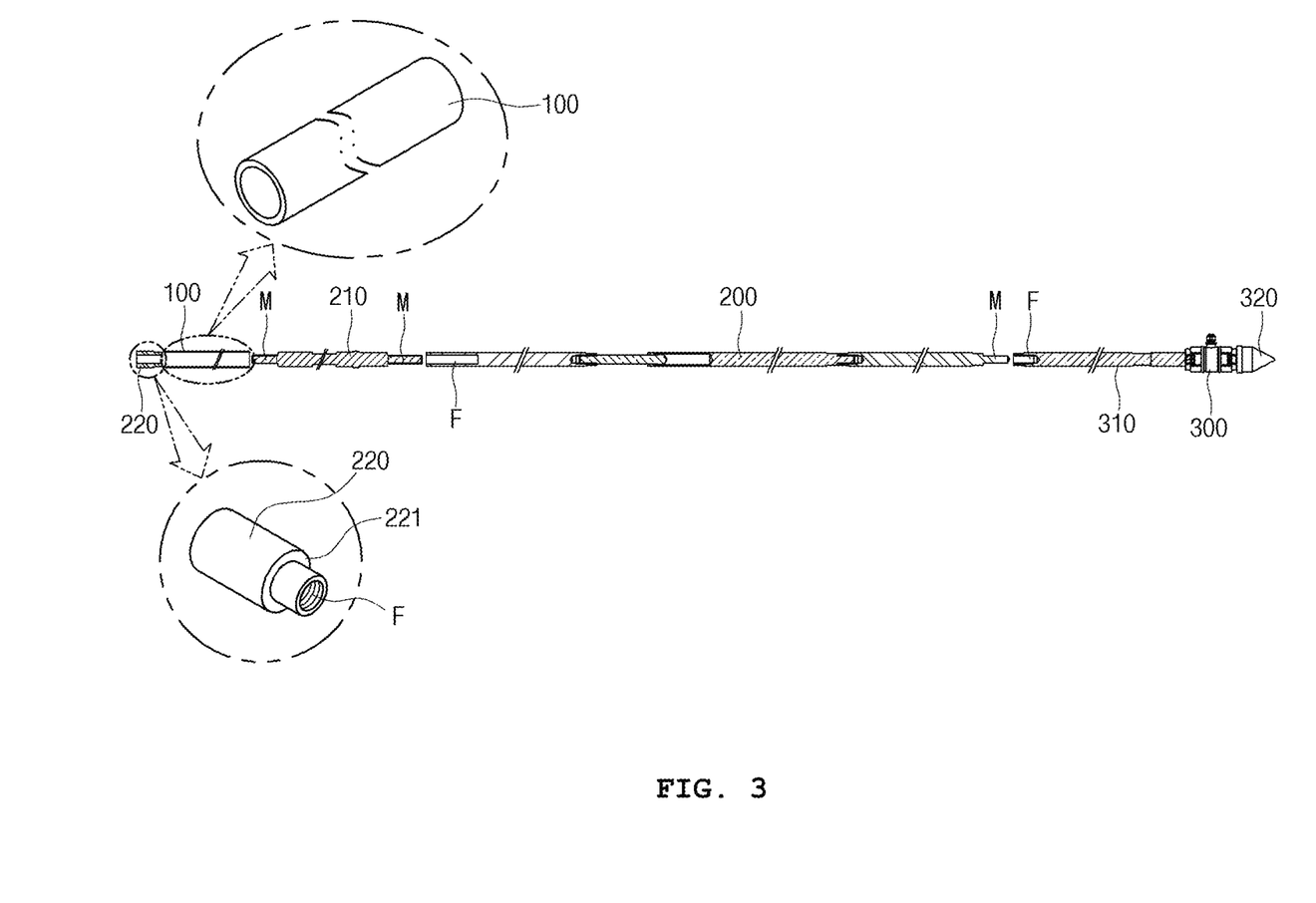
FIG. 3 is an exploded view showing a light-water reactor nuclear fuel rod loading force measuring apparatus according to an exemplary embodiment of the present disclosure.
Figure 4:
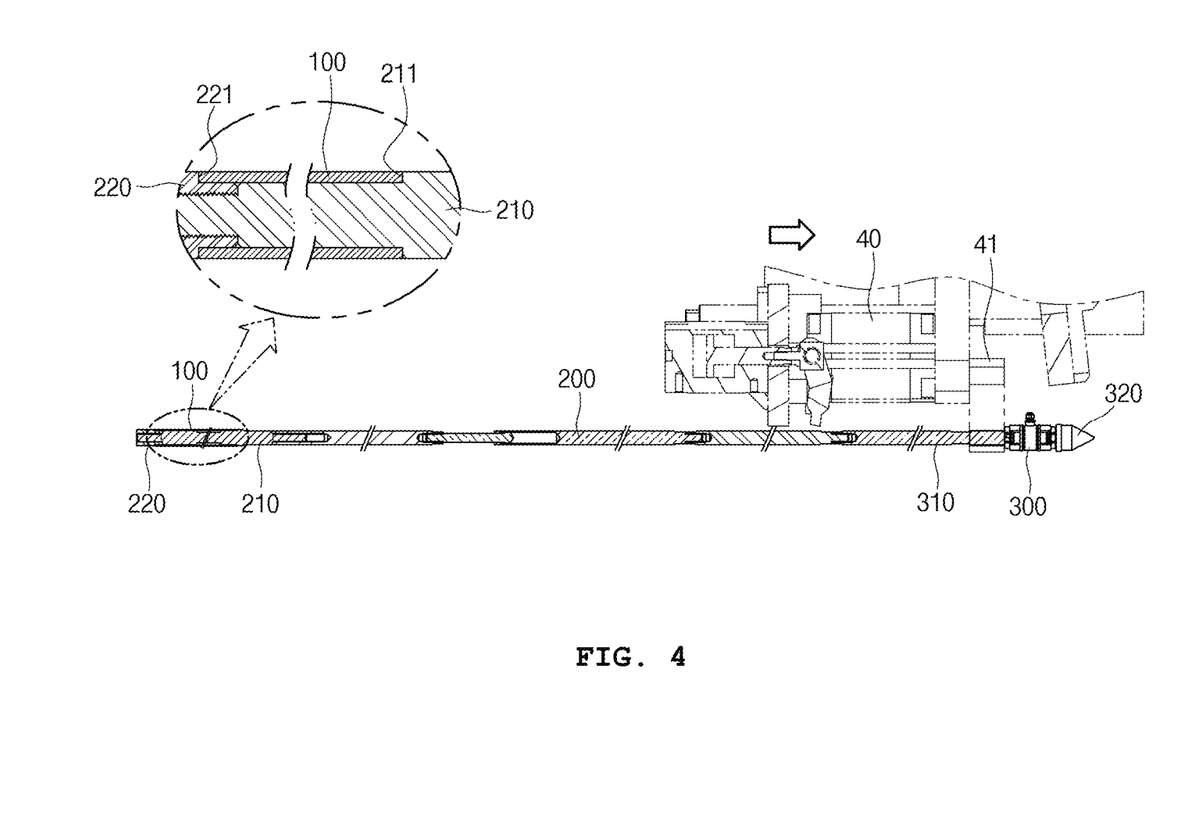
FIG. 4 is a view showing the light-water reactor nuclear fuel rod loading force measuring apparatus according to the exemplary embodiment of the present disclosure.

As shown in FIGS. 3 and 4, the light-water reactor nuclear fuel rod loading force measuring apparatus includes a cladding tube sample 100, a pulling bar 200, and a measuring means 300.

The cladding tube sample 100 is provided to measure the loading force of each cell 13a of the spacer grid 13 and is formed to have the same diameter and material as the zirconium cladding tube 20 of the nuclear fuel rod. The cladding tube sample 100 is made in a hollow form having opposite sides penetrated through. An operator may equally apply the loading conditions for the nuclear fuel rod to the spacer grid 13 by replacing the nuclear fuel rod 20 with the cladding tube sample 100 and increase reliability on the loading force measuring of each cell 13a of the spacer grid 13. The cladding tube sample 100 is provided to be towed by being coupled to the pulling bar 200.

Figure 5:
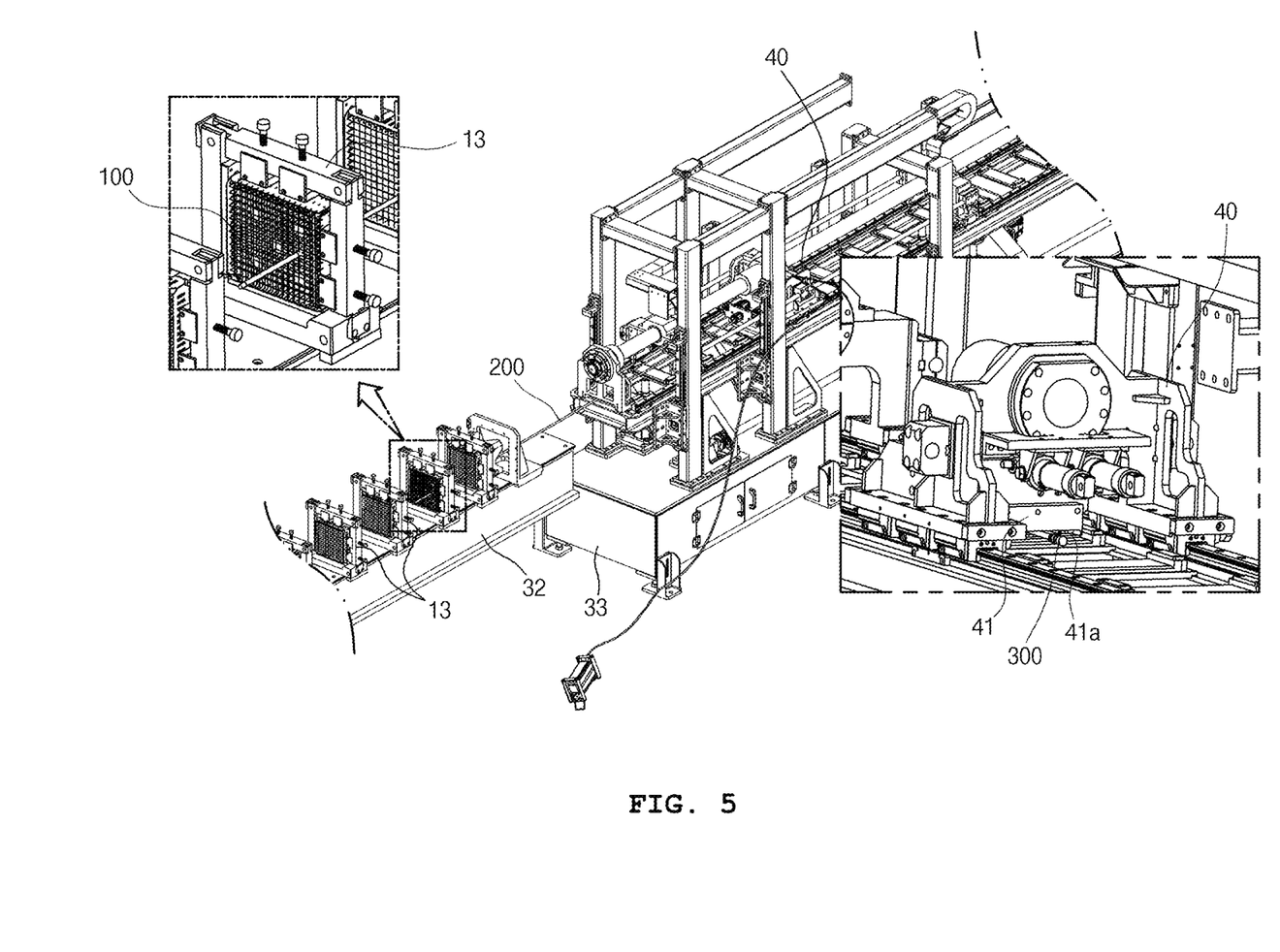
FIG. 5 is a view showing a state in which the light-water nuclear fuel rod loading force measuring apparatus according to the exemplary embodiment of the present disclosure is installed in the nuclear fuel rod loading apparatus of the nuclear fuel assembly.

The pulling bar 200 is installed between the cladding tube sample 100 and the measuring means 300 and serves as a medium means for pulling the cladding tube sample 100 through a traction module 40 (see FIG. 5). The pulling bar 200 is provided in a form of a bar corresponding to the loading bar, one end part of the pulling bar 200 is coupled to the cladding tube sample 100 and an opposite end part of the pulling bar 200 is coupled to the measuring means 300. At this time, the pulling bar 200 and the measuring means 300 may be configured to be screwed to each other. As the pulling bar 200 and the measuring means 300 are configured to be separated from each other, the pulling bar and the measuring means may be disposed on opposite sides based on a guide plate 41 of the traction module 40 to be described later, and the efficiency of maintenance of the measuring means 300 may be increased. As shown in FIG. 3, the opposite end part of the pulling bar 200 forms a male thread M, and the measuring means 300 includes a coupling rod having a female thread F formed thereon.

One end part of the pulling bar 200 further includes a holder 210 and a holder cap 220 configured to be couple to the cladding tube sample 100.

The holder 210 is a medium means configured to allow the cladding tube sample 100 that is hollow to be attached to and detached from the pulling bar 200 and has opposite end parts forming male threads M for being screwed. One end part of the pulling bar 200 forms a female screw F configured to be screwed to the holder 210. The holder 210 is formed to have a diameter that may pass through an inside of the cladding tube sample 100, and a step 211 is formed on an outer peripheral surface of the holder 210 so that the holder 210 does not completely pass through the cladding tube sample 100. An outer diameter of the step 211 of the holder 210 may be the same as that of the cladding tube sample 100. Due to the configuration of the step 211 of the holder 210 as shown in FIG. 4, a position of the cladding tube sample 100 on the holder 210 may be guided. The holder 210 is provided with a length such that an opposite end part of the holder 210 may be exposed outside the cladding tube sample 100 by passing through the cladding tube sample 100.

The holder cap 220 serves to fix the cladding tube sample 100 together with the holder 210. The holder cap 220 is provided to be screwed to the male screw M of the holder 210 exposed out of the cladding tube sample 100. The holder cap 220 forms a female screw F with which the male screw M of the holder 210 may be screwed. The holder cap 220 also forms a step 221. An outer diameter of the holder cap 220 is formed to be the same as that of the cladding tube sample 100 so that the cladding tube sample 100, when loaded into the cell 13a of the spacer grid 13, is prevented from interfering with the cell 13a, wherein a part of an outer diameter of the holder cap 220 is configured to be stepped so as to be positioned inside the cladding tube sample 100, so the holder cap 220 forms a step 221. Due to the configuration of the step 221 of the holder cap 220 as described above, the holder cap 220 is in close contact with the cladding tube sample 100 to further strengthen coupling force.

The measuring means 300 serves to measure the loading force acting on the cell 13a of the spacer grid 13 when the pulling bar 200 pulls the cladding tube sample 100 by the traction module 40. The measuring means 300 is installed on the pulling bar 200 in a direction the traction module 40 moves in the process where the traction module 40 pulls the pulling bar 200 so as to allow the force applied by the traction module 40 to directly act on the measuring means 300. As shown in FIG. 4, the measuring means 300 is installed to be caught and supported by the guide plate 41 provided in the traction module 40. As shown in FIG. 5, the guide plate 41 has through-holes 41a passing through both sides, and the measuring means 300 has a diameter formed to be larger compared with the through-holes 41a and is provided to be caught and supported by a surface of the guide plate 41. A load cell may be provided as the measuring means 300. The measuring means 300 is configured to be attached to and detached from the pulling bar 200 and includes a coupling rod 310 and a protection pin 320 as shown in FIG. 4. The coupling rod 310 is configured to be attached to and detached from the pulling bar 200 and is formed to have a smaller diameter compared with the through-hole 41a of the guide plate 41. One end part of the coupling rod 310 is provided to be screwed to the opposite end part of the pulling bar 200, and an opposite end part of the coupling rod 310 is provided to be screwed to the measuring means 300. The protection pin 320 serves to prevent the measuring means 300 from colliding with a structure on one side, when the measuring means 300 is moved by the traction module 40, and is coupled to the measuring means 300.

Hereinafter, a process of loading the fuel rod using the light-water reactor nuclear fuel rod loading force measuring apparatus having the above configuration will be described.

The operator installs the light-water reactor nuclear fuel rod loading force measuring apparatus between the spacer grid 13 and the traction module 40 of a loading power device 33. To this end, the operator passes the coupling rod 310 from one side of the through-hole 41a of the guide plate 41 in a state in which one end part of the pulling bar 200 and the coupling rod 310 are separated, and then screws the coupling rod 310 into the end part of the pulling bar 200 so as to be coupled to each other. At this time, the measuring means 300 is caught and supported by one surface of the guide plate 41. At this time, the one surface of the guide plate 41 refers to the surface in a direction in which the traction module 40 pulls the cladding tube sample 100.

The operator passes the pulling bar 200 from one side to an opposite side of the spacer grid 13 and then couples the cladding tube sample 100 to the holder 210 of the pulling bar 200 exposed to the opposite side of the spacer grid 13. At this time, the opposite end part of the cladding tube sample 100 is caught on the step 211 of the holder 210 so that the position thereof is guided.

The operator screws the holder cap 220 to the one end part of the holder 210 exposed outside the cladding tube sample 100, whereby the cladding tube sample 100 becomes to be in a state coupled to the pulling bar 200 at the opposite side of the spacer grid as shown in FIG. 5.

The operator operates the loading power device 33 to move the traction module 40 to the right in the drawing. The pulling bar 200 installed in the traction module 40 is moved together with the traction module 40, and according to the movement of the pulling bar 200, the cladding tube sample 100 is loaded into the cell 13a of the spacer grid 13. At this time, in the cladding tube sample 100, a loading force is generated by resistance of the cell 13a of the spacer grid 13, and the loading force is transmitted to the measuring means 300 through the pulling bar 200. That is, in a process where the traction module 41 pulls the pulling bar 200, the force acting on the guide plate 41 is transmitted to the measuring means 300 as it is so that the light-water reactor nuclear fuel rod loading force measuring apparatus is able to measure the loading force of the fuel rod imposed on the target cell 13a.

Through such an operation, when the loading force measuring for a specific cell 13a of the spacer grid 13 is completed, the operator separates the cladding tube sample 100 from the pulling bar 200 and performs test setting work to allow the cladding tube sample 100 to pass through another cell of the spacer grid 13. Thereafter, the loading force to another cell is measured by performing the above-described series of processes.

In this way, the operator may perform such that the loading force for all cells 13a of the spacer grid 13 is measured and then converted into data, thereby optimizing the nuclear fuel assembly process and effectively establishing an improvement plan.

Although the present disclosure has been described in detail with respect to the described embodiments, it is apparent to those skilled in the art that various changes and modifications are possible within the scope of the technical spirit of the present disclosure, and it is natural that such variations and modifications belong to the appended claims.

DESCRIPTION OF THE REFERENCE NUMERALS IN THE DRAWINGS

| | |
|---|---|
| 100: cladding tube sample | 200: pulling bar |
| 210: holder | 211, 221: step |
| 220: holder cap | 300: measuring means |
| 310: coupling rod | 320: protection pin |
| M: male thread | F: female thread |

The invention claimed is:

1. A light-water reactor nuclear fuel rod loading apparatus, which comprises a spacer grid holder and a loading power device installed with a traction module configured to reciprocally move toward the spacer grid holder, the loading apparatus further comprises:
 a hollow cladding tube sample, wherein the hollow cladding tube sample is configured to be positioned on one side of a spacer grid held by the spacer grid holder, and wherein the hollow cladding tube sample has a nuclear fuel rod cladding tube diameter;
 a pulling bar comprising one end part and an opposite end part, the one end part of the pulling bar passing in use through a cell of the spacer grid and is configured to be coupled to the hollow cladding tube sample, and wherein the opposite end part of the pulling bar is coupled to the traction module;
 a measuring device installed on the pulling bar, wherein the measuring device is configured to measure loading force of the traction module loading the pulling bar;
 a holder cap; and
 a holder comprising one end part and an opposite end part, wherein the one end part of the holder is screwed to the one end part of the pulling bar, and wherein the opposite end part of the holder is configured to in use pass through the hollow cladding tube sample and couple to the holder cap.

2. The loading apparatus of claim 1, wherein the traction module is provided with a guide plate, wherein the guide plate is formed with a through-hole passing through both sides of the guide plate, and
 wherein the opposite end part of the pulling bar in use passes through one side of the through-hole of the guide plate and is screwed to the measuring device at an opposite side of the through-hole of the guide plate.

3. The loading apparatus of claim 1, wherein the holder cap and the holder are each formed with a step to support the hollow cladding tube sample.

\* \* \* \* \*